Aug. 20, 1946.   M. KOULICOVITCH   2,406,299
MACHINE TOOL WITH PHOTOELECTRIC POSITIONING OF THE WORK TABLE
Filed Feb. 11, 1942   2 Sheets-Sheet 1

Inventor
M. Koulicovitch
By Hancock Downing & Seebolt
Attys

Patented Aug. 20, 1946

2,406,299

UNITED STATES PATENT OFFICE 2,406,299

MACHINE TOOL WITH PHOTOELECTRIC POSITIONING OF THE WORK TABLE

Maurice Koulicovitch, Geneva, Switzerland, assignor to Societe Genevoise d'Instruments de Physique, Geneva, Switzerland, a firm of Switzerland Application February 11, 1942, Serial No. 430,458 In Switzerland December 28, 1940

4 Claims. (Cl. 250—41.5)

The object of the present invention is a machine tool with photo-electric positioning of the work table. It will be used with advantage for instance to determine the position of sliding tables of measuring machines and of precision tool machines such as center punching machines and precision drilling machines.

The usual method for determining a position consists in observing with a microscope the divisions of a scale carried by the movable object and to bring the image of a given division to correspond with a reticle provided in the microscope. This method has the drawback that the precision of the reading depends on the skill of the operator and that the latter has to look intently into the ocular, which operation is fatiguing.

The apparatus according to the present invention is characterized by a photo-electric cell facing the scale, by a grid inserted between said cell and said scale, and by a source of light arranged in such a way as to send its beams onto the scale. The grid presents spaces open to light (openings or transparent zones). The beams of light coming from the scale and passing through the grid impress the photo-electric cell, except when the divisions of the scale cover the open spaces of the grid and intercept the light feeding the cell. In this latter case, there is a corresponding reaction of the cell.

The current variations of the photo-electric cell, amplified if necessary and transmitted further, can control the operations involved in the applications of the apparatus.

In this way, the necessity to look into an ocular and the fatigue resulting therefrom are avoided.

The attached drawings show, by way of example, four embodiments of the object of the present invention.

Each one of the Figures 1 to 4 shows schematically, and with sectional views, one of these embodiments.

Figure 1:
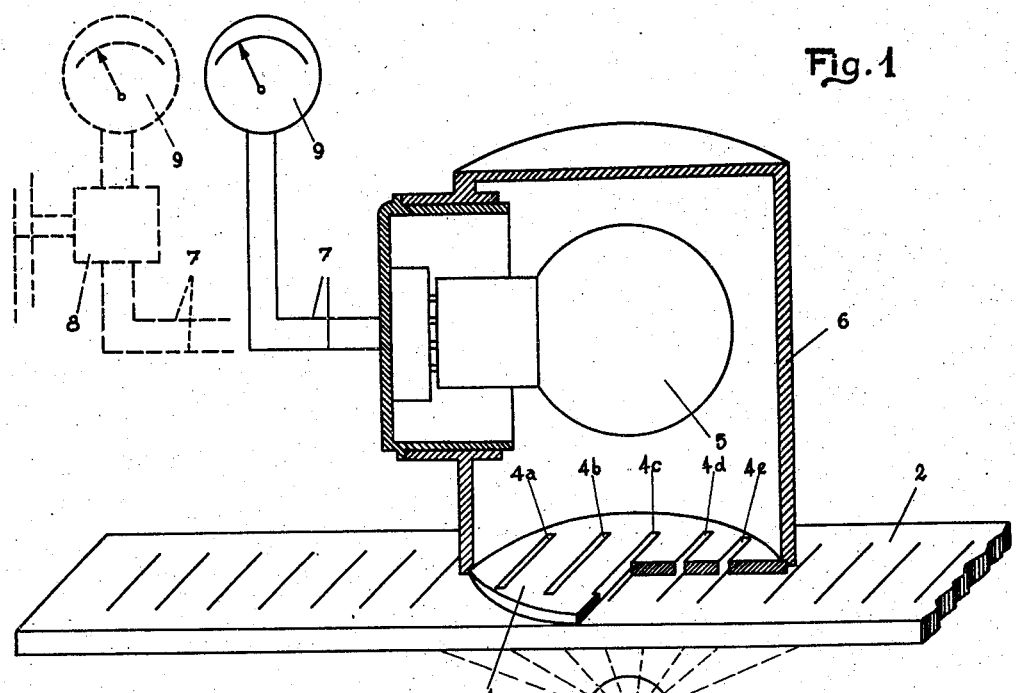

In the embodiment shown in Fig. 1, the grid 1 represented partly in sectional view is superposed on a graduated scale 2 which is movable and onto which an electric lamp 3 throws its light. The graduation is traced in black on a transparent background. The grid 1 presents a few slits 4a, 4b, 4c, 4d, 4e, by which the light passing through the lighted background of scale 2 can excite a photo-electric cell 5 enclosed in a housing 6. The shape of the slits of the grid 1 is such that for the determined positions of scale 2, in which these slits superpose themselves onto the graduation of the scale, the light passing through the grid 1 is diminished, the resulting reaction of the cell 5 producing a change in the current of the outer electrical circuit 7. This circuit 7, either directly, as shown in full lines, or by means of a relay 8, as shown in dotted lines, operates the signaling apparatus 9 represented in the form of a measuring instrument, and which could be replaced by a control apparatus intended for any function, such as for instance to stop the movable object.

Figure 2:
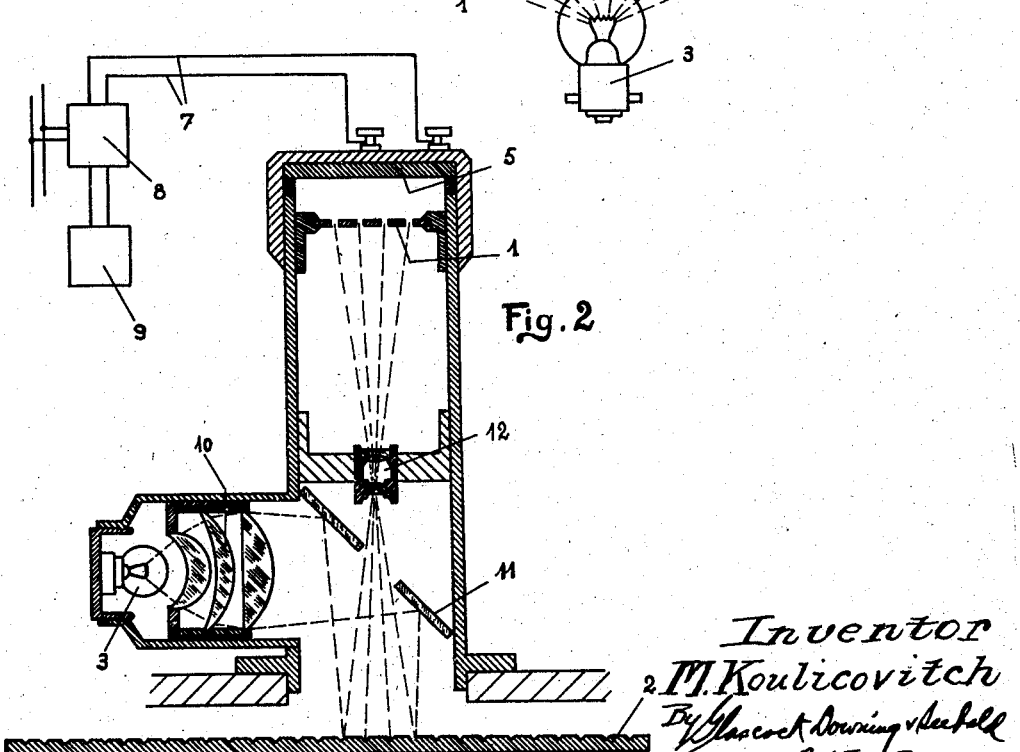
Figure 3:
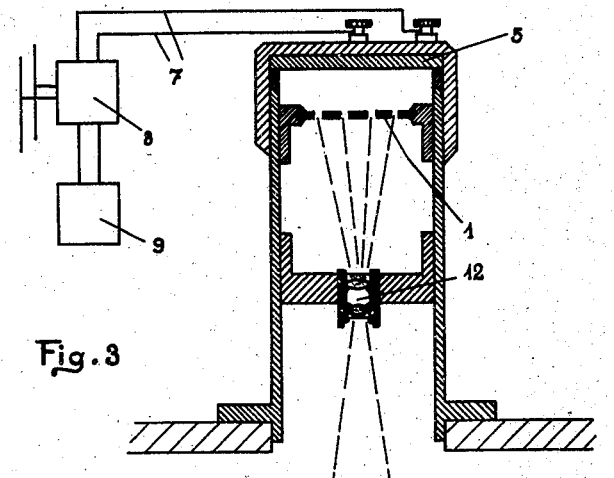

Two other embodiments, in which the graduation is traced in black on a reflecting or a transparent scale, are shown in Figs. 2 and 3.

Fig. 2 shows the case of a surface lighting of the scale and Fig. 3 that of a transparence lighting through the scale, with the same graduation. Lighting, in both embodiments is secured by a source of light 3 with its optical condenser 10 sending its light into the field of the apparatus, either by means of a mirror 11, or directly. In both cases, an objective 12 projects the image of the graduation 2 on the grid 1; 5 is the photoelectric cell. Elements 7, 8 and 9 are the same as in the previous figure.

It is possible to superpose a graduation traced in dark on a bright background or in bright on a dark background, or the image thereof, onto a grid provided with slits or with full spaces corresponding to the tracing; in place of slits, one could use full transparent spaces. One will choose in each particular case the most convenient combination, depending also whether one will characterize the superposition of the graduation and of the grid by a decrease or by an increase of the light received by the photo-electric device.

The graduation 2, the position of which is to be determined, can be composed either of equidistant straight lines, as shown in Figs. 1 to 3, or else of groups of lines, or even of figures, repeating themselves at every unit interval of the graduation. This arrangement has the advantage to permit greater variations of the amount of light passing through a grid made in accordance, and at the same time to obtain a high degree of precision, because each element of the tracing can be thinner and its superposition onto the corresponding element of the grid will be better defined.

If the graduation is composed of groups of parallel lines, there is advantage to arrange that the components of a same group of lines be not equidistant, in order that their exact and total superposition into the grid can only obtain in a single position defined for each group of lines.

Figure 4:
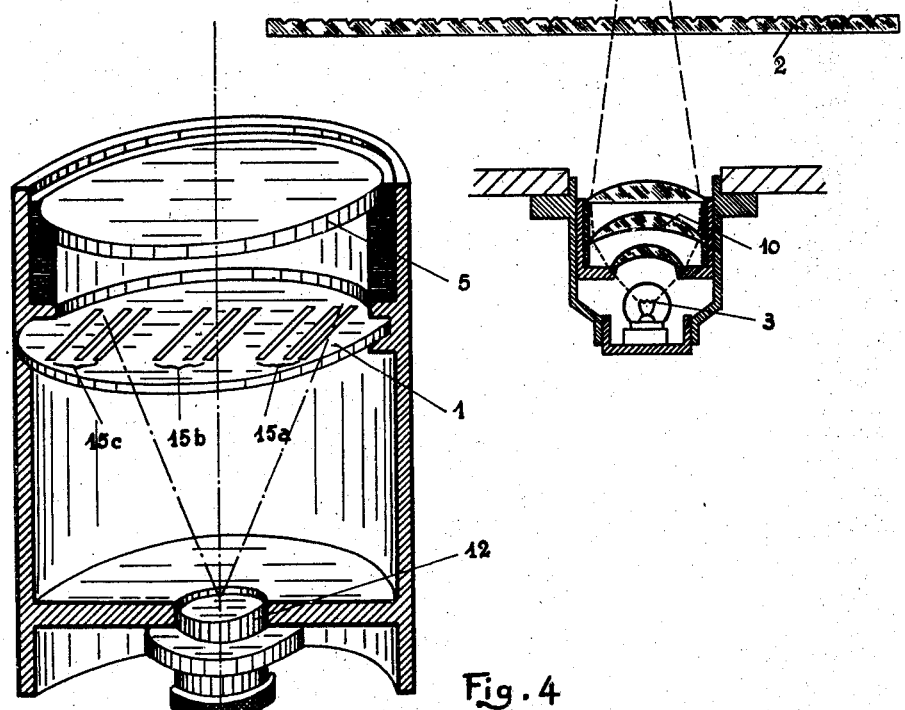

The embodiment shown in Fig. 4 is based on this principle. In this figure, one sees the objectives 12, the groups of lines 14a, 14b, 14c, etc., separating the unit intervals of the graduation, groups in which the lines are not equidistant between themselves, the grid 1 provided with the slits 15a, 15b, 15c, etc. . . . corresponding to the method of graduation of the scale, and the photoelectric cell 5. The lighting, however, is not shown on this figure, neither the other parts of the electrical circuit.

The graduation 2 need not be made necessarily with parallel straight lines, but can be realized with more complex tracings of any shape which can be used in the same way in cooperation with a grid made in accordance.

The object of the invention having thus been described and illustrated in the accompanying drawings, need not be explained further.

What is claimed to be new is:

1. In a machine-tool with photo-electric positioning of the work-table, in combination, a work-table carrying at least one scale having precision graduations arranged in succession at spaced points in the direction of movement of said table, a photo-electric cell facing said graduations, a grid having transparent and opaque parts interposed between said scale and said cell, the transparent parts of said grid being spaced apart in correspondence with and being in less number than said graduations, and means for directing an illuminated image of several of said graduations through the grid to said cell.

2. In a machine-tool with photo-electric positioning of the work-table, in combination, a work-table carrying at least one scale having precision graduations arranged in succession at spaced points in the direction of movement of said table, a photo-electric cell facing said graduations, a grid having transparent and opaque parts interposed between said scale and said cell, the transparent parts of said grid being spaced apart in correspondence with and being in less number than said graduations, and an optical device for projecting an illuminated image of several of said graduations through said grid to said cell.

3. An arrangement as claimed in claim 1, wherein said graduations are arranged in groups and the graduations of each group are of dissimilar form.

4. An arrangement as claimed in claim 1, wherein said grid is stationary with respect to said cell.

MAURICE KOULICOVITCH.